United States Patent [19]
Balasubramanian et al.

[11] Patent Number: 5,610,947
[45] Date of Patent: Mar. 11, 1997

[54] IR FM MODEM WITH FLASH MODULATION

[75] Inventors: Peruvemba S. Balasubramanian, Chappaqua; Nathan J. Lee, New City; Scott D. Lekuch, New York, all of N.Y.

[73] Assignee: International Business Machines Corporation, Armonk, N.Y.

[21] Appl. No.: 323,332

[22] Filed: Oct. 14, 1994

[51] Int. Cl.[6] .......................... H04L 27/10; H04B 10/00
[52] U.S. Cl. .................... 375/282; 375/237; 375/239; 375/276; 359/172; 359/182
[58] Field of Search .................. 375/237, 239, 375/276, 282, 272, 273; 359/172, 182

[56] References Cited

U.S. PATENT DOCUMENTS

| | | | |
|---|---|---|---|
| 3,665,103 | 5/1972 | Watkins | 375/276 |
| 3,683,277 | 8/1972 | Kuller | 375/276 |
| 3,743,775 | 7/1973 | Hutchinson | 375/276 |
| 3,890,581 | 6/1975 | Stuart | 375/303 |
| 4,189,756 | 2/1980 | Ninomiya | 375/282 |
| 4,377,006 | 3/1983 | Collins | 375/237 |
| 4,441,193 | 4/1984 | Bell | 375/276 |
| 4,888,791 | 12/1989 | Barndt, Sr. | 375/239 |
| 4,910,753 | 3/1990 | Wakatsuki | 375/334 |
| 5,128,792 | 7/1992 | Teich | 375/239 |
| 5,289,141 | 2/1994 | Nanni | 375/272 |
| 5,295,160 | 3/1994 | Shimizu | 375/272 |
| 5,297,181 | 3/1994 | Barr | 375/373 |
| 5,309,113 | 5/1994 | Mimura | 375/324 |
| 5,351,249 | 9/1994 | Lomp | 375/327 |
| 5,436,590 | 7/1995 | Simard | 375/334 |

*Primary Examiner*—Wellington Chin
*Assistant Examiner*—Vijay Shankar
*Attorney, Agent, or Firm*—Perman & Green

[57] ABSTRACT

Biphase or FM encoding is combined with Flash modulation in infrared (IR) communication. By shrinking the coded pulse width in the modulation process, power dissipation is effectively reduced to the point where FM encoding can be advantageously adapted to IR communication in a synchronous communication system. Noise filtering is also described.

28 Claims, 3 Drawing Sheets

IR FM MODEM WITH FLASH MODULATION

CROSS-REFERENCE

The present application and invention are related in subject matter to co-pending U.S. patent application Ser. No. 08/323,282 filed concurrently herewith by the same inventors and assigned to the same assignee as this application.

BACKGROUND OF THE INVENTION

1. Field of the Invention

The present invention relates to modulating digital communications and more particularly to using Biphase or FM encoding to modulate infrared communications.

2. Problem to be Solved

An important consideration in infrared (IR) communication is that the Infrared Data Access (IRDA) standard modulation scheme is heavily dependent on the data pattern being modulated. It is therefore not suitable for synchronous communication which requires that the received signal always include enough information to derive the bit rate clock and which benefits from a fairly constant DC signal level. In comparison to the IRDA standard, pulse position modulation (PPM) is quite adequate for infrared communication with respect to the power dissipation and data independent DC level shift. Hence, quite often the technique of pulse position modulation, e.g., four position PPM, is adopted for infrared communication because it requires few pulses to send a given amount of data while it maintains a constant DC level, independent of the data pattern being sent.

Offsetting these advantages, is the fact that PPM suffers a number of disadvantages as a larger number of positions are used. One disadvantage is that an analog phase lock loop becomes a mandatory requirement to track the incoming data. Consequently, the cost of the whole system is increased. A second disadvantage is that the DC level of a PPM signal with a large number of bit positions may not be as constant as desired. On the other hand, PPM also suffers a number of disadvantages as fewer bit positions are used. One such disadvantage is that the power dissipation increases with fewer bit positions. Further, PPM may not keep as constant a DC level as Biphase or FM coding schemes, even when only a few bit positions are used. Therefore, PPM encoding can be problematical with regard to synchronous communication in view of its DC level instability.

Biphase or FM encoding, involving biphase mark (FM1) and biphase space (FM0) encoding, and including a Manchester version, is a common modulation scheme in digital communication. The benefits of this encoding include the fact that the bit rate clock is carried as a part of the modulation and that it has a constant DC level which provides a balanced analog signal making it suitable for synchronous communication. However, in adapting it to infrared communication, this type of modulation is quite expensive in power dissipation in transmitting the signal. Nevertheless, it does have several attractive features. In addition to maintaining a constant DC level independent of the data pattern being transmitted, it also maintains the carrier frequency in a tight bandwidth. In comparison to PPM, the Biphase encoding scheme maintains a better constant DC level than four position PPM and it carries the bitrate clock as part of the encoded data while maintaining similar average power dissipation as four position PPM. Still, it is a drawback that Biphase or FM encoding typically consumes more power during transmission of an IR signal as compared to the IRDA and PPM modulation schemes. This excessive power consumption requirement during transmission of FM coding patterns via IR signal is the biggest concern regarding FM coding of infrared communications.

It accordingly is a problem in the art to find an infrared encoding or modulation system that is optimum in terms of power efficiency while it maintains the constant DC level and clock information carrying traits of Biphase encoding.

Objects

It is therefore an object of the present invention to provide an efficient system and encoding method for use in infrared communication that also offers versatility.

It is a further object of the invention to provide an efficient system and encoding method using Biphase encoding in infrared communication.

It is another object of the invention to resolve the problems of the prior art by combining Biphase encoding with flash modulation in infrared communication.

SUMMARY OF THE INVENTION

In accordance with the present invention the Biphase or FM encoding scheme is modified with. Flash modulation to shrink the coded pulse size and thus produce an efficient and versatile system and encoding method, i.e., an FM with FLASH (FM/Flash) MODEM, suitable for infrared communication. The power dissipation of the improved system is comparable to four position pulse modulation (PPM) while it maintains the advantages of Biphase encoding described above. This comparison is based on the assumption that four bit PPM uses a ½ bit period pulse width, one for every two bits, while the present FM with Flash technique uses one ¼ cycle pulse per bit on average. More particularly, the bit cell of Biphase or FM formatted data is conceptually divided into half bit cells. In the present system, whenever an input signal of FM encoded data on a transmitter line is HIGH during a half bit cell, a Flash pulse of less than half a bit cell width, e.g., about ¼ bit cell width, is generated and transmitted. However, while Biphase encoded signals have a transition at the end of each bit cell, when not receiving an input signal to be encoded or otherwise, the data line can idle at HIGH level, so that multiple flash pulses will be sent out if the transmitter line is simply sampled at every half bit cell. In order to eliminate these extra pulses while the transmitter is idling, the modulator is designed so that it must detect a transition on the transmitter data line in order to start the modulation. The modulation then only runs for a one bit cell period. As soon as the transmitter data line level becomes LOW, the modulator is reset to the initial state and is ready to check for the next transitioning edge. When the modulator next detects a rising edge on the transmitted data, it puts out a ¼ bit cell long Flash pulse. Then, as it reaches the middle of the bit cell, it sends out another ¼ bit cell long pulse if the data line has stayed HIGH for the second half of the bit cell. If the data line in the second half of the bit cell goes LOW, then the modulator resets to the initial state and waits for the next rising edge. Hence, after sending two consecutive ¼ bit cell long pulses, one at the beginning of the bit cell and the next one at the beginning of the second half of the bit cell, no more pulses will be sent out if the data remains at the HIGH level. No further pulses will be sent until the modulator detects another rising edge. Therefore, if the FM encoded data is HIGH for only half a bit cell, the modulator will send only one ¼ bit cell long Flash pulse at the beginning of the FM encoded pulse. If the FM encoded data is HIGH for one bit cell long, the modulator will send two ¼ bit cell long pulses, one at the beginning and the other at the half bit cell period.

At the demodulator, once an incoming signal pulse is detected, it is prolonged to half a bit cell long. The demodulator then samples the level of the incoming data at the middle of the bit cell. If the sample is HIGH, it extends the half bit cell prolonged pulse to a full bit cell long. In this case, the demodulator will wait until the middle of the next bit cell before looking for the next incoming pulse since in a Biphase encoded signal there is a transition at the end of each bit cell so that the signal will go LOW. If, on the other hand, the middle of the bit-cell sample is LOW, then the demodulator checks for the next pulse only near the end of the current bit cell as determined from the edge of the first incoming pulse. This demodulation scheme therefore generates back an FM encoded signal from the FM with Flash modulated signal it receives.

In order to filter out noise, the demodulator also includes logic to validate an incoming pulse. When the demodulator detects the rising edge of an incoming pulse, it then samples the pulse level after a predefined time which is less than a ¼ bit cell. If it samples a HIGH level, it assumes the incoming pulse is valid. If it samples a LOW level, it ignores the pulse and waits for the next one.

DETAILED DESCRIPTION OF THE INVENTION

The Biphase or FM with Flash (FM/Flash) MODEM of the invention may be implemented in a standard cell ASIC along with a synchronous communication controller that has a built-in FM encoder/decoder. The synchronous communication controller may also have a digital phase lock loop built-in, so that one need not be incorporated into the MODEM. A 16 times oversampling clock is preferred in this implementation which provides for 16 counts per bit cell.

Figure 1:
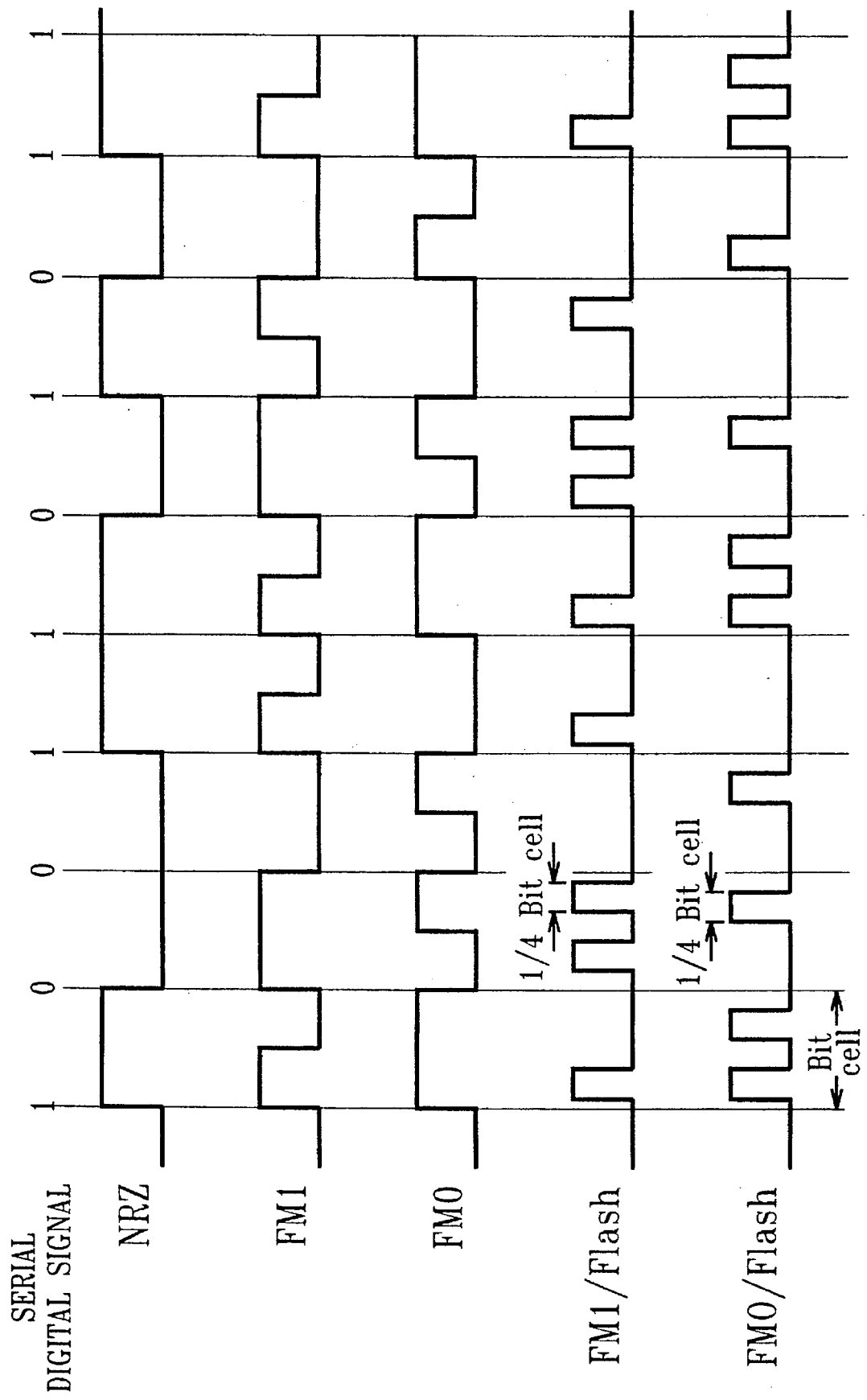
FIG. 1 illustrates a comparison of the forms of signals resulting from modulating a serial digital input signal in accordance with different encoding techniques including prior art Non-Return-to-Zero (NRZ), FM1, and FM0 encoding, and FM1/Flash and FM0/Flash encoding in accordance with the present invention.

FIG. 1 illustrates the forms of signals modulated in accordance with different prior art encoding techniques as well as the reduced pulse width modulated signals of the invention. The uppermost signal form shown is the serial digital input to be encoded, followed by the prior art Non-Return-to-Zero (NRZ) coding format, and two corresponding forms for the FM1 and FM0 versions of Biphase encoding. The lower two signals are indicative of the corresponding forms produced by FM1/Flash and FM0/Flash encoding in accordance with the present invention.

Figure 2:
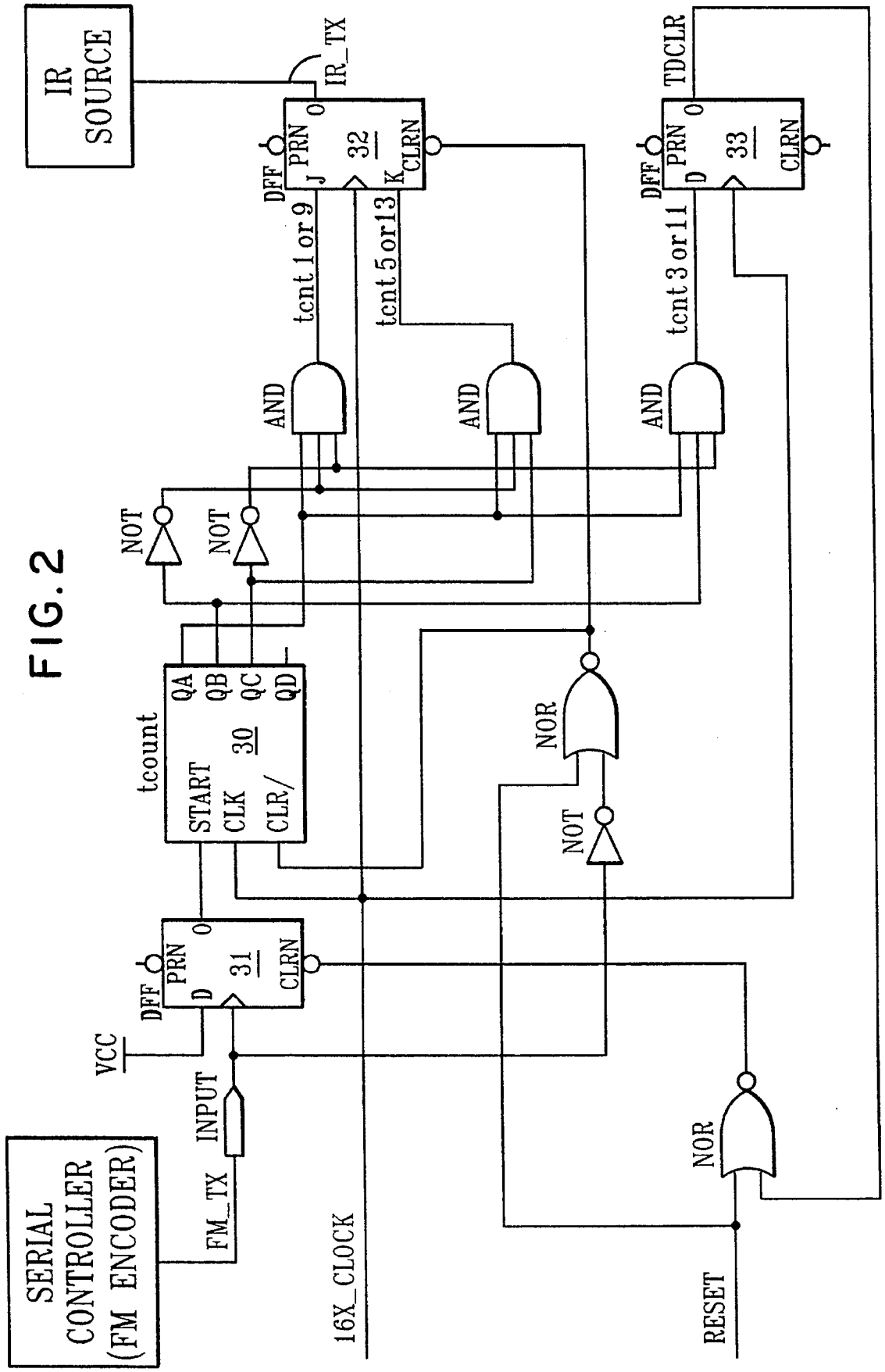
FIG. 2 is a schematic diagram of an FM/Flash modulator in accordance with the invention.
Figure 3:
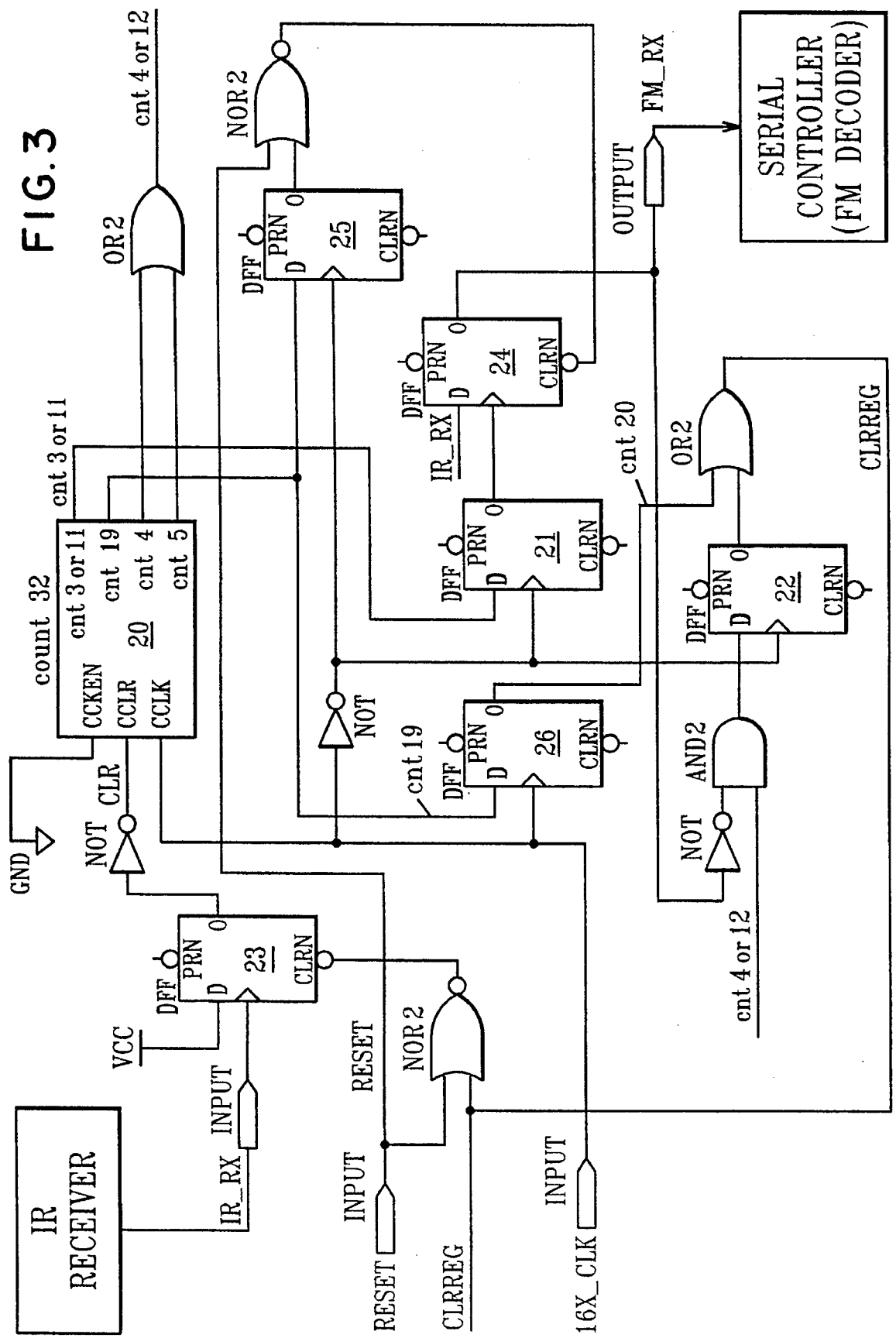
FIG. 3 is a schematic diagram of an FM/Flash demodulator in accordance with the invention.

The components of the FM/Flash MODEM are shown in FIGS. 2 and 3. The modulator, as seen in FIG. 2, is implemented using a 4-bit counter 30 that can be triggered to count once from zero up to fifteen when a START input is activated by the output of delay-flipflop 31. When the counter 30 wraps back to zero, it stops counting unless the START input is active at that time. The START input to the counter 30 is a synchronous FM encoded input and the CLR/input is an asynchronous clear_not input through inverter (NOT) and NOR gate NOR. Output QA of counter 30 is the least significant count output bit and QD is the most significant count output bit. The modulator is initialized to a known valid state as the RESET signal, input to NOR gates NOR, is active. When an FM encoded transmitted data signal, from the Serial Controller 34, goes HIGH on the FM_TX input line, the output of delay-flipflop 31 gets set to 1 causing the counter 30 to start counting at the next rising edge of the signal from the 16 times oversampling clock on 16X_CLK. When counter 30 counts to 1, the J input of J-K flip-flop 32 is set, and the output of the modulator, on line IR_TX, gets set at the rising edge of the signal on 16X_CLK starting an output pulse at HIGH level. At the count of five, the K input of J-K flip-flop 32 is set, which causes the output on IR_TX to be reset ending the pulse. This four count setting and resetting results in the sending of about ¼ bit cell long pulse on line IR_TX to an IR source 35. The IR source 35 converts the electronic pulse to a corresponding IR light pulse for transmission as part of an encoded signal to a demodulator.

If the FM encoded signal, on line FM_TX, becomes LOW at the middle of the bit cell long time, the IR_TX line gets cleared by an asynchronous clear signal regardless of the count of counter 30. This clear signal is provided to the CLRNport of D-flipflop 32 and the CLR/input of counter 30 through the inverter (NOT) and NOR gate NOR. If the Biphase encoded signal on FM_TX happens to be a bit-cell long, the second ¼ bit-cell long pulse will be sent on IR_TX at the count of 9, using the components as described in the preceding paragraph, and IR_TX gets reset at the count of 13. The first D-flipflop 31 that got set as the FM_TX signal made the transition from LOW to HIGH will be reset at the count of 3 and 11, by the output of D-flipflop 33 so that the D-flip-flop 31 is ready to detect the next rising edge of the signal on FM_TX. The counter 30 gets cleared to zero either when it wraps back from count 15 or when the FM_TX input becomes LOW. The demodulator as shown in FIG. 3 first detects a rising edge on the incoming infrared pulse signal, IR_RX, from an IR Receiver 36 that detects the IR ¼ bit cell width light pulses output by the modulator's IR Source 35. When the rising edge is detected, latch 23 gets set, and a 5-bit counter 20 begins to count up starting from zero. The counter 20 is clocked at the rising edge of the 16X_CLK input. When counter 20 counts 3 and 11, latch 21, between latches 25 and 26, gets set on the next rising edge of the clock pulse. The incoming IR_RX signal is fed directly to D-flipflop 24, and is sampled when latch 24 gets triggered by the output of latch 21, whereupon a half bit cell long demodulated FM encoded signal, FM_RX, is generated if IR_RX is HIGH. The FM_RX signal output from latch 24 is fed to a Serial Controller 37 for the decoding of the FM encoding to NRZ format in an infrared communication system. Thus, D-flipflop 24 samples IR_RX at counts 3 and 11, and is cleared at the count of 19 upon detection by latch 25.

The FM encoded FM_RX output signal is sampled by latch 22 at counts 4 and 12 and if FM_RX is LOW at that time, the D-flipflop 23 that detects a rising edge of IR_RX gets cleared so that it is ready to detect the next rising edge. At the count of 20, which is detected by latch 26, D-flipflop 23 will also get cleared regardless of the level of the FM_RX signal that was sampled prior to this. When the D-flipflop 23 gets cleared, the counter 20 also resets the count to zero and stays at that count until the next incoming rising edge is detected by D-flipflop 23.

It should be seen that in order to filter out noise, the demodulator includes logic to validate an incoming pulse. As explained, when counter 20 counts 3 and 11, latch 21, gets set on the next rising edge of the clock pulse and the incoming IR_RX signal, fed directly to D-flipflop 24, is sampled when latch 24 gets triggered by the output of latch 21. The output FM_RX signal from latch 24 will go HIGH or LOW in accordance with the level of the sampled IR_RX signal. Then, this FM_RX output signal is sampled by latch 22 at counts 4 and 12 and if FM_RX is LOW at those times, the D-flipflop 23 that detects a rising edge of IR_RX gets cleared so that it is ready to detect the next rising edge. Thus, if the demodulator detects the rising edge of an incoming pulse, the pulse level will be sampled after a predefined time, preferably 3 clock counts, which will be less than the width of a ¼ bit cell pulse. If the sample is of a HIGH level, it is assumed the incoming pulse is valid and a HIGH level is output. If the sample is of a LOW level, the pulse is ignored and the system is reset to await the next one.

This demodulator therefore puts out FM encoded data on line FM_RX from the incoming FM with Flash modulated signal on IR_RX. Consequently, the FM/Flash MODEM of the invention accepts FM encoded data as input and outputs FM encoded data after transmission between its components, so that any associated equipment or systems with which it is used need not be specially adapted to deal with its internal encoding, i.e., FM with Flash encoding.

The Biphase or FM with FLASH MODEM of the invention can be used with both FM0 or FM1 encoded data as well as Manchester coded data and is suitable for synchronous communication. A full digital phase lock loop is not required but can be included as part of the demodulator, if desired, its implementation being within the purview of those of skill in the art.

The FM with Flash MODEM described herein is particularly suitable for use in the Interoperable Multiprotocol Directed Infrared Wireless Communication Controller disclosed in our co-pending U.S. patent application Ser. No. 08/323,282 filed concurrently herewith and incorporated herein by reference. This MODEM also can be used in any communication controller that uses Biphase or FM modulation providing that the analog circuit that is used to amplify and filter the signal in the receiver can pass this modulated signal.

While the invention has been particularly shown and described with respect to a preferred embodiment thereof, it will be understood by those skilled in the art that changes in form and details may be made therein without departing from the scope and spirit of the invention.

What is claimed is:

1. In a Biphase or FM modulation system including means for FM encoding a digital input signal by producing an FM encoded output signal comprising HIGH levels and LOW levels, having lengths of no less than half a bit cell period and no more than one bit cell period, indicative of transitions in said digital input signal, the improvement comprising:

means, responsive to said FM encoded output signal, for Flash modulating said FM encoded output signal by producing pulses of less than half a bit cell width in accordance with the levels of said FM encoded output signal in each half bit cell period, said means for Flash modulating comprising:

counter means, responsive to the receipt of a HIGH level of said FM encoded output signal, for outputting count pulses including a first count pulse and a fifth count pulse;

first means, responsive to the first count pulse from said counter means, for outputting a pulse signal; and second means, responsive to the fifth count pulse, for ceasing said pulse signal output by said first means.

2. A system as in claim 1 wherein said means for Flash modulating comprises means for producing pulses of about ¼ bit cell widths.

3. A system as in claim 1 wherein said counter means outputs a ninth count pulse and a thirteenth count pulse, and said first means outputs a pulse signal in response to the ninth count pulse; and said second means, in response to the thirteenth count pulse, ceases said pulse signal output by said first means.

4. A system as in claim 1 wherein said counter means outputs a third count pulse and an eleventh count pulse, and comprises:

means for sensing the beginning of a HIGH level of said FM encoded output signal, and outputting a signal to start said count pulses; and further comprising means for resetting said sensing means in response to the third and eleventh count pulses.

5. A system as in claim 1 further comprising:

means for sensing a LOW level of said FM encoded output signal and producing a signal indicative of the sensing of a LOW level of said FM encoded output signal; and means, responsive to said signal indicative of the sensing of a LOW level of said FM encoded output signal, for resetting said counter means to zero.

6. A system as in claim 1 further comprising means for demodulating said Flash modulated pulse signals comprising:

means for receiving incoming Flash modulated pulses from said Flash modulating means; and means, responsive to the receipt of an incoming Flash modulated pulse by said receiving means, for outputting a half bit cell width signal upon the sensing thereof.

7. A system as in claim 6 wherein said outputting means comprises:

counter means for outputting count pulses; and first means, responsive to the third count pulse and the eleventh count pulse from said counter means, for sampling said receiving means for an incoming Flash modulated pulse and outputting a half bit cell width signal upon the sensing thereof.

8. A system as in claim 7 wherein said means for demodulating further comprises:

second means, responsive to the fourth count pulse from said counter means, for sampling the output of said first means and resetting said counter means to zero when no half bit cell width signal is sensed.

9. A system as in claim 8 wherein said second means comprises means for sampling the output of said first means in response to the twelfth count pulse from said counter means, and for resetting said counter means to zero when no half bit cell width signal is sensed.

10. A system as in claim 1 further comprising means for converting the pulses produced by said means for Flash modulating to IR light pulse signals.

11. In a Biphase or FM modulation system including means for FM encoding a digital input signal by producing an FM encoded output signal comprising HIGH levels and LOW levels, having lengths of no less than half a bit cell period and no more than one bit cell period, indicative of transitions in said digital input signal, the improvement comprising:

means, responsive to said FM encoded output signal, for Flash modulating said FM encoded output signal by producing pulses of less than half a bit cell width in accordance with the levels of said FM encoded output signal in each half bit cell period; and means for demodulating said Flash modulated pulse signals comprising:

means for receiving incoming Flash modulated pulses from said means for Flash modulating; and means, responsive to the receipt of an incoming Flash modulated pulse by said receiving means, for outputting a half bit cell width signal, said means for outputting comprising:

counter means for outputting count pulses including a third, a fourth, an eleventh, and a twelfth count pulse; and first means, responsive to the third count pulse and the eleventh count pulse from said counter means, for sampling said receiving means for an incoming Flash modulated pulse and outputting a half bit cell width signal.

12. A system as in claim 11 wherein said means for demodulating further comprises:

second means, responsive to the fourth count pulse from said counter means, for sampling the output of said first means and resetting said counter means to zero when no half bit cell width signal is sensed.

13. A system as in claim 12 wherein said second means comprises means for sampling the output of said first means in response to the twelfth count pulse from said counter means, and for resetting said counter means to zero when no half bit cell width signal is sensed.

14. A system as in claim 11 further comprising means for converting the pulses produced by said means for Flash modulating to IR pulse signals.

15. In a Biphase or FM modulation process involving FM encoding a digital input signal by producing an FM encoded output signal comprising HIGH levels and LOW levels, having lengths of no less than half a bit cell period and no more than a bit cell period, indicative of transitions in said digital input signal, the method comprising the steps of:

receiving said FM encoded output signal; and

Flash modulating said FM encoded output signal by producing pulses of less than half a bit cell width in accordance with transitions in the levels of said FM encoded output signal in each half bit cell period, said Flash modulating step comprising:

outputting count pulses in response to the receipt of a HIGH level of said FM encoded output signal, including a first, a third, a fifth, a ninth, an eleventh, and a thirteenth count pulse;

outputting a pulse signal in response to the receipt of the first count pulse; and ceasing the outputting of said pulse signal in response to the fifth count pulse.

16. A method as in claim 15 wherein said Flash modulating step comprises producing pulses of about ¼ bit cell widths.

17. A method as in claim 15 comprising the further steps of:

outputting a pulse signal in response to the ninth count pulse; and ceasing said pulse signal output in response to the thirteenth count pulse.

18. A method as in claim 15 comprising the further steps of:

outputting a signal to start said count pulses upon the sensing of the beginning of a HIGH level of said FM encoded output signal; and resensing the level of said FM encoded output signal in response to the third and eleventh count pulses.

19. A method as in claim 15 further comprising the steps of:

sensing a LOW level of said FM encoded output signal and producing a signal indicative of the sensing of a LOW level of said FM encoded output signal; and resetting said counter means to zero in response to said signal indicative of the sensing of a LOW level of said FM encoded output signal.

20. A method as in claim 15 further comprising demodulating said Flash modulated pulse signals by the steps of:

receiving incoming Flash modulated pulses; and outputting a half bit cell width signal in response to the receipt of an incoming Flash modulated pulse.

21. A method as in claim 20 comprising the further steps of:

outputting count pulses in response to the receipt of an incoming Flash modulated pulse;

sampling for the receipt of an incoming Flash modulated pulse in response to the third and eleventh count pulses; and outputting a half bit cell width signal upon the sensing thereof.

22. A method as in claim 21 further comprising the steps of:

responsive to the fourth count pulse, sampling for the output of a half bit cell width signal; and resetting the count pulses to zero when no half bit cell width signal is sensed.

23. A method as in claim 22 further comprising the steps of:

sampling for the output of a half bit cell width signal in response to the twelfth count pulse; and resetting said count pulses to zero when no half bit cell width signal is sensed.

24. A method as in claim 15 further comprising the step of converting said Flash modulated pulses of less than a half bit cell width to IR light pulse signals.

25. In a Biphase or FM modulation process involving FM encoding a digital input signal by producing an FM encoded output signal comprising HIGH levels and LOW levels, having lengths of no less than half a bit cell period and no more than a bit cell period, indicative of transitions in said digital input signal, the method comprising the steps of:

receiving said FM encoded output signal; and

Flash modulating said FM encoded output signal by producing pulses of less than half a bit cell width in accordance with transitions in the levels of said FM encoded output signal in each half bit cell period; and receiving said Flash modulated pulses of less than half a bit cell width;

outputting a half bit cell width signal in response to the receipt of a Flash modulated pulse of less than half a bit cell width;

outputting count pulses in response to the receipt of a Flash modulated pulse of less than half a bit cell width, including a third, a fourth, and an eleventh count pulse;

sampling for the receipt of an incoming Flash modulated pulse of less than half a bit cell width in response to the third and eleventh count pulses; and outputting a half bit cell width signal upon the sensing of a Flash modulated pulse of less than half a bit cell width.

26. A method as in claim 25 further comprising the steps of:

responsive to the fourth count pulse, sampling for said outputting of a half bit cell width signal; and resetting the count pulses to zero when no half bit cell width signal is sensed.

27. A method as in claim 26 further comprising the steps of:

sampling for said outputting of a half bit cell width signal in response to the twelfth count pulse; and resetting said count pulses to zero when no half bit cell width signal is sensed.

28. A method as in claim 25 further comprising the step of converting said Flash modulated pulses of less than a half bit cell width to IR pulse signals.

* * * * *